United States Patent Office 2,711,996
Patented June 28, 1955

2,711,996

SYNTHETIC FILM COMPRISING A VINYLIDENE CHLORIDE COPOLYMER, AN ESTER WAX, A LONG-CHAIN POLAR COMPOUND AND CALCIUM CARBONATE

Charles H. Hofrichter, Jr., Snyder, N. Y., assignor to E. I. du Pont de Nemours and Company, Wilmington, Del., a corporation of Delaware No Drawing. Application June 10, 1950,
Serial No. 167,485

14 Claims. (Cl. 260—23)

This invention relates to films and film coatings, and relates more particularly to improved film coatings and self-sustaining film of vinylidene chloride copolymers.

Films having a regenerated cellulose base are widely used for wrapping tissue. Since cellulosic materials are readily penetrated by moisture and lose strength when wet, regenerated cellulose film is usually coated with a flexible moisture-resistant composition to impart durability and resist passage of moisture through the composite film. It is also usually desirable for the film coating to be colorless, transparent, non-tacky and non-toxic in contact with food, and for the coated film to be heat-sealable. The coating material should be one which is readily applied by ordinary solution-coating methods.

Organic solvent-soluble vinylidene chloride copolymers, such as copolymers of vinylidene chloride with a minor proportion of acrylonitrile, fulfill the requirements enumerated to a high degree. In addition, these copolymers may be cast by conventional methods to form self-sustaining films, which also have the advantageous characteristics of the above-mentioned coated films and have the strength to be widely useful. However, there is an additional property required of wrapping tissues where unmodified vinylidene copolymer film coatings and films are seriously deficient. This is the property of good "slip," by which is meant that film-to-film and film-to-metal coefficient of friction must be sufficiently low so that the tissues may be handled readily in packaging operations. An especially difficult problem arises when the wrapping tissues are to be used in packaging machines employing heat-sealing operations, as these can only perform satisfactorily when the adhesion of the film to the hot metal sealing grids is of a very low order. The requirement is such that, when the surface of a film is pressed firmly against the metal at heat sealing temperatures, the film should release freely from the metal when the pressure is removed. Unmodified vinylidene chloride-acrylonitrile copolymer film coatings adhere to the hot metal grids to such an extent that automatic packaging machines of this type cannot be operated.

Accordingly it is an object of the present invention to improve the slip characteristics, and the hot stick characteristics in particular, of film coatings and self-sustaining film of vinylidene chloride copolymers to the point where the film will operate satisfactorily in packaging machines employing heat-sealing operations, without impairing the other desirable properties of unmodified copolymer films noted above, such as transparency, durability, moisture-proofness and heat-sealability. Another object is to provide film-forming compositions from which the above films may be prepared. These and other objects will more clearly appear hereinafter.

The above objects are accomplished in accordance with this invention by incorporating in vinylidene chloride copolymer films a small amount of a slip agent comprising an ester wax, an approximately equal amount of a long chain aliphatic polar compound and an approximately equal amount of finely divided calcium carbonate.

The amount of slip agent used may vary over a considerable range, depending upon the type of copolymer film as well as the degree of slipperiness and freedom from hot stick desired, and depending to some extent on the specific ingredients of the slip agent and the thickness of the film coating or self-sustaining film. The upper limit is determined by the maximum amount of slip agent which can be tolerated without causing objectionable cloudiness, blush or haze in the film. The lower limit is determined by the minimum amount of slip agent which will provide adequate slip and freedom from hot stick. As a general rule the amount of both the ester wax and the long chain aliphatic polar compound should be in the range of 0.2% to 1.0% by weight, based on the weight of vinylidene copolymer, the preferred amount being about 0.5% of each. The useful range for the calcium carbonate is from 0.05% to 2.0%, the preferred amount being from 0.1% to 0.5%. Hence the slip agent, per se, may comprise essentially 2 to 10 parts of an ester wax, 2 to 10 parts of a long chain aliphatic polar compound and 0.5 to 20 parts of finely divided calcium carbonate.

Any ester wax, either natural or synthetic, is suitable for purposes of this invention. As examples of natural waxes which are effective, there may be mentioned carnauba, spermaceti, candellila and palm waxes. Effective synthetic waxes are "Opal wax" (hydrogenated castor oil), benzyl stearate, pentaerythritol distearate, pentaerythritol tetrastearate, stearyl stearate, etc.

Any long chain aliphatic polar compound, either natural or synthetic, is suitable for use as the second ingredient of the slip agent. Common examples of such compounds are the fatty acids, such as stearic, palmitic and oleic acids, stearyl stearamide, dilauryl phosphate, dicetyl phosphate and montan wax.

No equivalents for calcium carbonate in the slip agent have been found, even though a variety of finely divided inorganic materials have been tried. This is surprising and indicates that calcium carbonate does not serve as a mere surface modifier in the manner that dusting powders function in many applications.

The slip agents of this invention are most useful for preventing hot stick of vinylidene chloride-acrylonitrile copolymer films containing 80% to 94% of polymerized vinylidene chloride. However, they are also effective with any vinylidene chloride copolymer capable of forming a film, whether as a film coating or as a self-sustaining film. Examples of suitable copolymers are those of vinylidene chloride with acrylonitrile, vinyl chloride, vinyl acetate, methyl vinyl ketone, or butyl methacrylate, as well as copolymers or vinylidene chloride with two or more of these copolymerizable materials. These copolymers may be prepared in the manner disclosed in United States Patent No. 2,278,415 to Arnold.

The vinylidene chloride-acrylonitrile copolymers probably have their most important application in moisture-proofing regenerated cellulose or other non-fibrous, water-sensitive films used as wrapping tissue, and the invention will be further described with particular reference to such applications. The general procedure for applying the film coating to the regenerated cellulose base is to dissolve or disperse the copolymer and the slip agent in a suitable organic solvent, apply the solution or dispersion to the base by any of the usual coating techniques, such as by spraying, brushing, roll application, etc., and then dry the film coating. In order to obtain good adherence of the film coating it is usually desirable to first subcoat the base with a nitrocellulose lacquer.

The following examples, wherein are set forth specific embodiments, will further illustrate the invention. Parts and percentages are by weight unless otherwise indicated.

EXAMPLE 1

A sheet of 300 gauge regenerated cellulose containing 22% glycerol was coated with a subcoat composition consisting of:

5% solids as follows: | Per cent
--- | ---
Maleic acid | 10
Melamine formaldehyde, n-butanol resin | 25
Nitrocellulose (11.6% N) | 65
95% solvent as follows: |
Toluene | 35
n-Butanol | 10
Ethyl acetate | 55 to the extent of 1 gram of solids per square meter of film, and dried at 120° C. for 40 seconds. The resulting coated sheet was thereafter topcoated with a composition consisting of:

15% solids as follows: | Per cent
--- | ---
80:20 vinylidene chloride-acrylonitrile copolymer | 98.9
Carnauba wax | 0.5
Stearic acid | 0.5
Finely divided calcium carbonate | 0.1
85% solvent as follows: |
Toluene | 10
Methyl ethyl ketone | 90 to a thickness of 8 grams of solids per square meter of film, and dried (solvent removed) at 130° C. for 100 seconds.

The resulting coated sheet was transparent, slippery to the touch, and operated successfully on automatic packaging machines employing heat sealing operations without jamming. A similar sheet differing only in that it contained no stearic acid or calcium carbonate could not be handled in the same automatic machines without jamming.

EXAMPLE 2

A sheet of 300 gauge regenerated cellulose containing 22% glycerol was subcoated as in Example 1 and was then topcoated with a solution composition consisting of:

20% solids as follows: | Per cent
--- | ---
90:10 vinylidene chloride-acrylonitrile copolymer | 98.75
Carnauba wax | 0.5
Stearic acid | 0.5
Finely divided calcium carbonate | 0.25
80% solvent as follows: |
Toluene | 50
Methyl ethyl ketone | 50 to a thickness of 4 grams of solids per square meter of film and dried at 130° C. for 100 seconds.

The resulting coated sheet was transparent, slippery to the touch and operated successfully on automatic packaging machines employing heat-sealing operations without jamming. A similar sheet differing only in that the calcium carbonate was omitted stuck excessively to hot metal even at temperatures as low as 45° C., and could not be handled in the automatic machines.

EXAMPLE 3

A sheet of 300 gauge regenerated cellulose containing 20% ethylene glycol was subcoated as in Example 1 and was then topcoated with a solution composition consisting of:

20% solids as follows: | Per cent
--- | ---
94:6 vinylidene chloride-acrylonitrile copolymer | 98.5
Carnauba wax | 0.5
Stearic acid | 0.5
Finely divided calcium carbonate | 0.5
80% solvent as follows: |
Toluene | 50
Methyl ethyl ketone | 50 to a thickness of 4 grams of solids per square meter of film and dried at 130° C. for 100 seconds.

The resulting sheet was transparent, had adequate slip and hot stick characteristics, and operated successfully on automatic packaging machines employing heat-sealing operations without jamming.

In order to give an approximate quantitative evaluation of the hot stick characteristics of film coatings the following test was devised:

A sample of coated sheet was pressed at 40 pounds per square inch for 10 seconds against a heated brass plate by means of a spring-mounted "Teflon" covered aluminum block ("Teflon" is polymerized tetrafluoroethylene). The "Teflon" covered block was then swung out of the way and the adhesion was determined as the force in grams needed to pull the sample perpendicularly upward off of the plate. This was repeated on fresh film samples until equilibrium readings were obtained, because of the accumulations of coating material on the heated plate. Generally 8 cycles were required to obtain equilibrium and 8 subsequent cycles were averaged for the result reported. The width of the "Teflon" covered pressing surface was 3/16 inch, and the width of sample pressed on the heated plate was 1¼ inches, making the pressed film area 0.23 square inch. Therefore the total block force required to give 40 pounds per square inch pressure was approximately 10 pounds.

An evaluation by the above method of film-coatings on regenerated cellulose, prepared as described in Examples 1 and 2 is shown in the following table. The maximum adhesive force which could be measured with the equipment used was 150 grams.

Table

| Film Coating | Adhesion at 90° C. |
| --- | --- |
| 80:20 Vinylidene chloride-acrylonitrile copolymer | (Greater than 150). |
| 80:20 Vinylidene chloride-acrylonitrile copolymer plus .05% Carnauba wax and .05% Stearic acid. | 90. |
| 80:20 Vinylidene chloride-acrylonitrile copolymer plus .05% Carnauba wax, .05% Stearic acid and 0.25% calcium carbonate. | 50. |
| 90:10 Vinylidene chloride-acrylonitrile copolymer | (Greater than 150). |
| 90:10 Vinylidene chloride-acrylonitrile copolymer plus 0.5% Carnauba wax and 0.5% Stearic acid. | 150. |
| 90:10 Vinylidene chloride-acrylonitrile copolymer plus 0.5% Carnauba wax and 0.5% Stearic acid and 0.25% Calcium carbonate. | 52. |

From the above it is seen that the present situation provides a means for greatly increasing the utility of vinylidene chloride-acrylonitrile copolymer films, whether coated on a film base or as self-sustaining films.

As different embodiments of this invention may be made without departing from the spirit and scope thereof, it is to be understood that the invention is not limited to the specific products disclosed except as defined in the appended claims.

What is claimed is:

1. A transparent film comprising essentially a vinylidene chloride copolymer containing from 80% to 94% of vinylidene chloride as the sole film-former and, based on the weight of said copolymer, from 0.2% to 1.0% of a fatty acid containing from 16 to 18 carbon atoms, and 0.05% to 2.0% of finely divided calcium carbonate.

2. A transparent film comprising essentially a vinylidene chloride-acrylonitrile copolymer as the sole film-former, said copolymer containing from 80% to 94% of polymerized vinylidene chloride, and, based on the weight of said copolymer, 0.2% to 1.0% of an ester wax, 0.2% to 1.0% of a fatty acid containing from 16 to 18 carbon atoms, and 0.05% to 2.0% of finely divided calcium carbonate.

3. A transparent film comprising essentially a vinylidene chloride-acrylonitrile copolymer as the sole film-former, said copolymer containing approximately 90% of polymerized vinylidene chloride, and, based on the weight of said copolymer, 0.2% to 1.0% of an ester wax, 0.2% to 1.0% of a fatty acid containing from 16 to 18 carbon atoms, and 0.05% to 2.0% of finely divided calcium carbonate.

4. A transparent film comprising essentially a vinylidene chloride-acrylonitrile copolymer containing from 80% to 94% of vinylidene chloride as the sole film-former and, based on the weight of said copolymer, about 0.5% of carnauba wax, about 0.5% of stearic acid, and 0.1% to 0.5% of finely divided calcium carbonate.

5. A moisture-proof, heat-sealable wrapping tissue comprising a regenerated cellulose base provided with a film coating comprising essentially a vinylidene chloride copolymer containing from 80% to 94% of vinylidene chloride as the sole film-former and, based on the weight of said copolymer, 0.2% to 1.0% of an ester wax, 0.2% to 1.0% of a fatty acid containing from 16 to 18 carbon atoms, and 0.05% to 2.0% of finely divided calcium carbonate.

6. A moisture-proof, heat-sealable wrapping tissue comprising a regenerated cellulose base provided with a film coating comprising essentially a vinylidene chloride-acrylonitrile copolymer as the sole film-former, said copolymer containing from 80% to 94% of polymerized vinylidene chloride, and, based on the weight of said copolymer, 0.2% to 1.0% of an ester wax, 0.2% to 1.0% of a fatty acid containing from 16 to 18 carbon atoms, and 0.05% to 2.0% of finely divided calcium carbonate.

7. A moisture-proof, heat-sealable wrapping tissue comprising a regenerated cellulose base provided with a film coating comprising essentially vinylidene chloride-acrylonitrile copolymer containing from 80% to 94% of vinylidene chloride as the sole film-former and, based on the weight of said copolymer, about 0.5% of carnauba wax, about 0.5% of stearic acid, and 0.1% to 0.5% of finely divided calcium carbonate.

8. A self-sustaining film comprising essentially a vinylidene chloride copolymer containing from 80% to 94% of vinylidene chloride as the sole film-former and, based on the weight of said copolymer, 0.2% to 1.0% of an ester wax, 0.2 to 1.0% of a fatty acid containing from 16 to 18 carbon atoms, and 0.05% to 2.0% of finely divided calcium carbonate.

9. A self-sustaining film comprising essentially a vinylidene chloride-acrylonitrile copolymer containing from 80% to 94% of vinylidene chloride as the sole film-former and, based on the weight of said copolymer, about 0.5% of an ester wax, about 0.5% of a fatty acid containing from 16 to 18 carbon atoms, and 0.1% to 0.5% of finely divided calcium carbonate.

10. A film-forming composition comprising essentially an organic solvent solution of a vinylidene chloride copolymer containing from 80 to 94% of vinylidene chloride as the sole film-former and, based on the weight of said copolymer, 0.2% to 1.0% of an ester wax, 0.2% to 1.0% of a fatty acid containing from 16 to 18 carbon atoms, and 0.05% to 2.0% of finely divided calcium carbonate.

11. A film-forming composition comprising essentially an organic solvent solution of vinylidene chloride-acrylonitrile copolymer as the sole film-former, said copolymer containing from 80% to 94% of polymerized vinylidene chloride, and, based on the weight of said copolymer, 0.2% to 1.0% of an ester wax, 0.2% to 1.0% of a fatty acid containing from 16 to 18 carbon atoms and 0.05% to 2.0% of finely divided calcium carbonate.

12. A film-forming composition comprising essentially an organic solvent solution of vinylidene chloride-acrylonitrile copolymer containing 80% to 94% of vinylidene chloride as the sole film-former and, based on the weight of said copolymer, about 0.5% of an ester wax, about 0.5% of a fatty acid containing from 16 to 18 carbon atoms, and 0.1% to 0.5% of finely divided calcium carbonate.

13. A slip agent comprising essentially 2 to 10 parts of an ester wax, 2 to 10 parts of a fatty acid containing from 16 to 18 carbon atoms, and 0.5 to 20 parts of finely divided calcium carbonate.

14. A slip agent comprising essentially about 5 parts carnauba wax, about 5 parts stearic acid, and 1 to 5 parts of finely divided calcium carbonate.

References Cited in the file of this patent

UNITED STATES PATENTS

| Number | Name | Date |
| --- | --- | --- |
| 1,622,353 | Shapiro | Mar. 29, 1927 |
| 2,297,183 | Fabian et al. | Sept. 29, 1942 |
| 2,388,166 | Luckenbach | Oct. 30, 1945 |
| 2,448,799 | Happoldt et al. | Sept. 7, 1948 |
| 2,455,611 | Schlattman | Dec. 7, 1948 |
| 2,525,671 | Hauser | Oct. 10, 1950 |
| 2,528,506 | Foye | Nov. 7, 1950 |